UNITED STATES PATENT OFFICE.

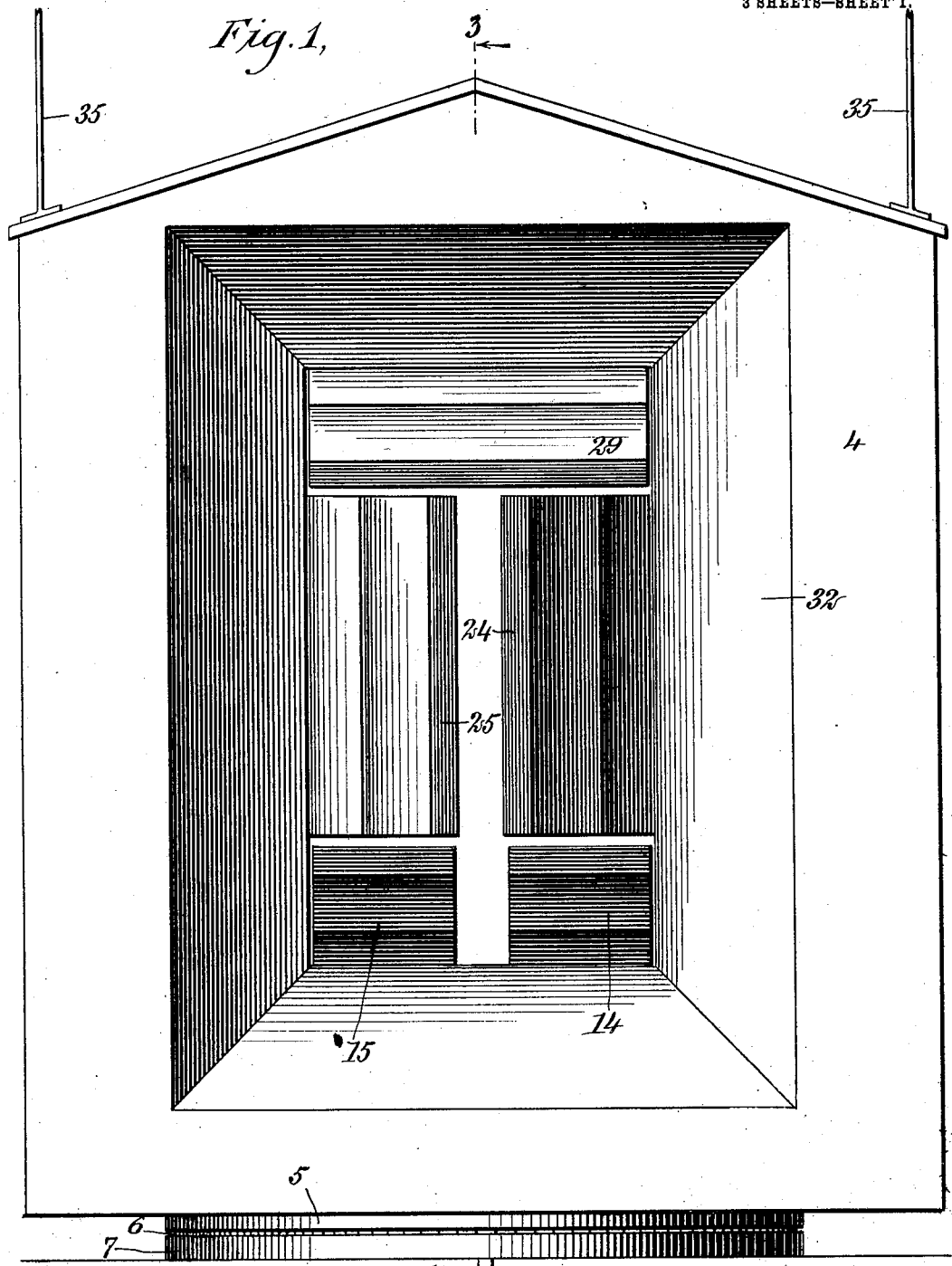

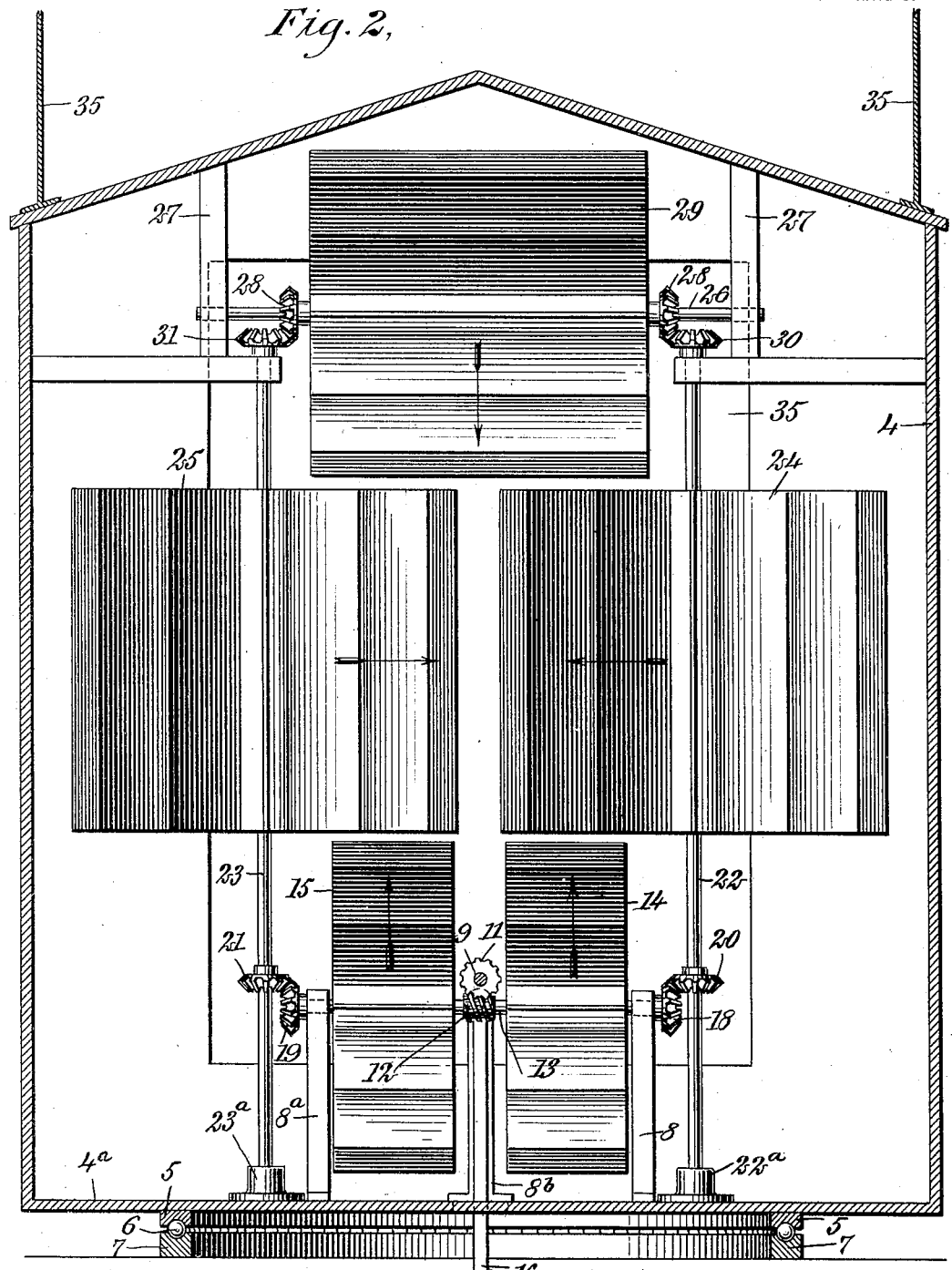

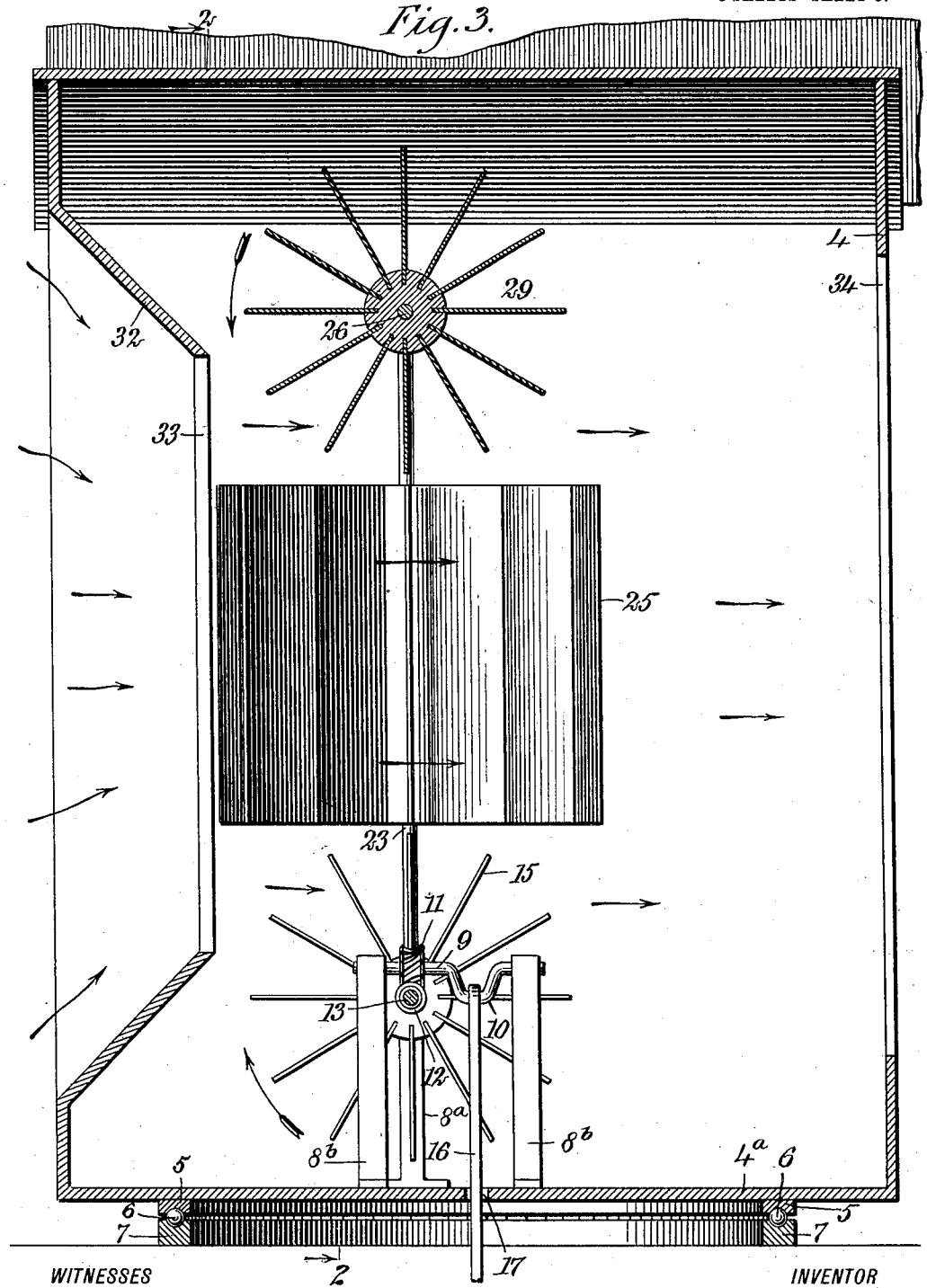

CHARLES DAUB, OF NEW YORK, N. Y.

WIND-MOTOR.

932,253.

Specification of Letters Patent.

Patented Aug. 24, 1909.

Application filed December 15, 1908. Serial No. 467,678.

*To all whom it may concern:*

Be it known that I, CHARLES DAUB, a citizen of the United States, and a resident of the city of New York, Bedford Park, borough of the Bronx, in the county and State of New York, have invented a new and Improved Wind-Motor, of which the following is a full, clear, and exact description.

My invention relates to wind motors, my more particular purpose being to provide a type of wind motor in which there are two sets of wind wheels turning in planes which cross each other, the combined effect of all of the wind wheels being transmitted ultimately to a shaft or other driven member common to all of the wind wheels.

My invention further relates to a casing for closing the wind wheels in such manner as to so direct the wind relatively to the wind wheels as to turn the latter with a maximum of efficiency.

My invention relates further to improved means for causing the casing, carrying the wind wheels, to feather properly in relation to the direction in which the wind is traveling.

My invention further contemplates various changes in construction whereby the efficiency of wind motors is greatly increased.

Reference is to be had to the accompanying drawings forming a part of this specification, in which similar characters of reference indicate corresponding parts in all the figures.

Figure 1 is a front elevation of the device, showing the casing mounted upon a ball bearing and free to turn for the purpose of feathering relatively to the direction in which the wind is blowing, this view further showing the wind wheels in so far as the same are visible when in operation; Fig. 2 is a section substantially upon the line 2—2 of Fig. 3, looking in the direction of the arrows and showing more particularly the arrangement of the various wind wheels and the gearing whereby their cumulative action is brought to bear upon a single driven member; and Fig. 3 is a section upon the line 3—3 of Fig. 1, looking in the direction of the arrows, and showing the relations of the various wind wheels to the wind channel through which the air current passes in driving the wheels.

A casing is shown at 4 and has generally a box-like form. Mounted under a flooring 4ª closing the lower end of this casing is a large ring 5 disposed horizontally and resting upon balls 6, the latter in turn resting upon a stationary ring 7. The two rings 5, 7, together with the balls 6, constitute a type of ball bearing, so supporting the casing 4 that the latter is free to turn. Mounted upon the flooring 4ª are standards 8, 8ª, 8ᵇ for supporting various working parts. One of these parts is a revoluble shaft 9 which is provided with a crank 10, as indicated in Fig. 3.

Mounted rigidly upon the shaft 9 is a worm wheel 11 and meshing with the latter is a worm 12, the latter being secured rigidly upon a shaft 13 whereby it is turned. A pair of wind wheels 14, 15, are mounted rigidly upon the shaft 13 and disposed upon opposite sides of the worm 12. A pitman 16 is connected with the crank 10 and is driven thereby for the purpose of transmitting the power developed by the wind motor. This pitman extends through a hole 17 in the flooring 4ª and may be readily connected with an air compressor or any other mechanism suitable to be driven.

Mounted upon opposite ends of the shaft 13 are bevel gears 18, 19. These mesh with bevel gears 20, 21 which are secured rigidly upon vertical shafts 22, 23, these shafts at their bottoms being mounted upon ball bearings 22ª, 23ª. Mounted upon the shafts 22, 23 are wind wheels 24, 25, each having its axis vertical. In the top of the casing 4 is a horizontal shaft 26 supported upon frame members 27, the latter being secured rigidly within the casing. Mounted rigidly upon the shaft 26 and revoluble therewith are bevel gears 28 and also a wind wheel 29, the axis of these three parts last mentioned being horizontal. Bevel gears 30, 31 are mounted upon the upper ends of the vertical shafts 22, 23, and mesh with the bevel gears 28.

A wind chute 32 is mounted upon the framework and is provided with an opening 33 which is in substantial registry with a somewhat larger opening 34 disposed in the back of the casing. These two openings and the space intermediate them together constitute a wind channel through which the wind is free to blow, and by virtue of the shape of the chute 32 the wind pressure is somewhat increased. The wind chute 32 is so disposed (see Fig. 1) that substantially half of each wind wheel is protected from the wind, so that the exposed portions—that is, those visible in Fig. 1—receive the full power of the wind and turn accordingly.

The arrangement of the various wind wheels, the shafts and the gears is such that when the wind blows through the wind channel, all of the wheels turn as indicated by the arrows in Fig. 2 and the action of the wheels is cumulative in the sense that each wheel, acting through the gearing driven by it, tends to turn the shaft 9 in the same direction in which each other wind wheel tends to turn it.

Mounted upon the top of the casing 4 are vanes 35 which tend to turn edgewise toward the direction from which the wind is coming. The action of the wind channel is such that when the wind passes through the machine, there is more or less tendency of the casing to feather relatively to the wind. This is upon the principle that the device, being free to turn, will move into such direction as to obstruct the passage of the wind as little as possible, or, in other words, take up the position of least resistance.

From the above description it will be noted that no matter what may be the direction of the wind, the casing will accommodate itself accordingly and will so dispose the various wind wheels as to promote their greatest efficiency.

Having thus described my invention, I claim as new and desire to secure by Letters Patent:

1. The combination of a casing through which extends a wind channel, a plurality of wind wheels mounted upon opposite sides of said wind channel and projecting partially into the same, said wind wheels being adapted to turn in opposite directions, another wind wheel mounted within said casing and projecting into said wind channel, the axis of rotation of said last-mentioned wind wheel crossing the general direction of the axis of rotation of said first-mentioned wind wheel, and mechanism connected with all of said wind wheels for receiving therefrom the power developed thereby.

2. The combination of a casing provided with a chute for admitting the wind thereinto, said chute having walls inclined obliquely inward in order to increase the wind pressure within said casing, and a plurality of wind wheels mounted within said casing and so disposed as to be partially screened from the wind by aid of said inclined walls, one of said wind wheels being mounted to turn about a vertical axis and another being mounted to turn about a horizontal axis.

In testimony whereof I have signed my name to this specification in the presence of two subscribing witnesses.

CHARLES DAUB.

Witnesses:
 WALTON HARRISON,
 EVERARD B. MARSHALL.